(12) United States Patent
Lagadec et al.

(10) Patent No.: US 10,393,546 B2
(45) Date of Patent: Aug. 27, 2019

(54) DEVICE AND METHOD FOR DETERMINING THE ATTITUDE OF A SATELLITE, AND SATELLITE CARRYING SUCH A DEVICE

(75) Inventors: Kristen Lagadec, Centres (FR); Anais Ardan, Mons (FR)

(73) Assignee: Airbus Defence And Space SAS, Toulouse (FR)

(*) Notice: Subject to any disclaimer, the term of this patent is extended or adjusted under 35 U.S.C. 154(b) by 848 days.

(21) Appl. No.: 14/398,461

(22) PCT Filed: May 4, 2012

(86) PCT No.: PCT/EP2012/058184
§ 371 (c)(1),
(2), (4) Date: Dec. 11, 2014

(87) PCT Pub. No.: WO2012/152669
PCT Pub. Date: Nov. 15, 2012

(65) Prior Publication Data
US 2015/0088453 A1     Mar. 26, 2015

(51) Int. Cl.
*G01D 5/14* (2006.01)
*B64G 1/28* (2006.01)
*B64G 1/36* (2006.01)

(52) U.S. Cl.
CPC .......... *G01D 5/142* (2013.01); *B64G 1/283* (2013.01); *B64G 1/361* (2013.01)

(58) Field of Classification Search
CPC .......... B64G 1/36; B64G 1/361; B64G 1/363; B64G 1/365; B64G 2001/245; B64G 1/283; G01D 5/142
See application file for complete search history.

(56) References Cited

U.S. PATENT DOCUMENTS 3,998,409 A    12/1976   Pistiner
4,417,141 A *  11/1983   Phillips ............... G01P 13/045
                                                    250/231.14
(Continued)

FOREIGN PATENT DOCUMENTS

EP    1134640 A2    9/2001

OTHER PUBLICATIONS

Lee et al., Sensorless Torque Estimation using Adaptive Kalman Filter and Disturbance Estimator, IEEE, 2010.*

*Primary Examiner* — Kyle R Quigley
(74) *Attorney, Agent, or Firm* — Im IP Law; C. Andrew Im; Chai Im (57) ABSTRACT

A device for determining the attitude or variation in attitude of a satellite fitted with an attitude control system comprising at least one inertial actuator. The inertial actuator comprises a rotary element mounted to rotate about an axis of rotation. The rotation of the rotary element is controlled to generate a torque to control controlling the attitude of the satellite. The angular sensor of the device measures the angular rotation of the rotary element about its axis of rotation. The computation unit determines the attitude or variation in attitude of the satellite induced by the rotation of the rotary element as a function of the measurements of angular rotation of the rotary element by the angular sensor. A satellite carrying such a device and a method for determining the attitude or variation in attitude.

22 Claims, 2 Drawing Sheets

(56) References Cited

U.S. PATENT DOCUMENTS

| | | | |
|---|---|---|---|
| 6,020,956 A * | 2/2000 | Herman | B64G 1/24 244/166 |
| 6,263,264 B1 | 7/2001 | Herman et al. | |
| 2002/0121573 A1 | 9/2002 | Vandenbussche et al. | |
| 2004/0120595 A1 * | 6/2004 | Choi | G06T 5/006 382/254 |
| 2007/0072546 A1 * | 3/2007 | Jenkin | H04B 7/18582 455/13.1 |
| 2008/0046138 A1 * | 2/2008 | Fowell | B64G 1/36 701/13 |

* cited by examiner

DEVICE AND METHOD FOR DETERMINING THE ATTITUDE OF A SATELLITE, AND SATELLITE CARRYING SUCH A DEVICE

RELATED APPLICATIONS

This application is a § 371 application from PCT/EP2012/058184 filed May 4, 2012, which is herein incorporated by reference in its entirety.

TECHNICAL FIELD

The present invention belongs to the field of artificial satellites whose attitude is controlled by means comprising one or more inertial actuators. More particularly, the present invention relates to a method and a device for determining the attitude and/or the attitude variation of such a satellite, and a satellite with such a device installed.

BACKGROUND OF THE INVENTION

To determine the attitude of a satellite, it is known practice to install a stellar sensor in the satellite. Such a stellar sensor is an optical sensor which observes an area of space, and which determines the attitude of said satellite as a function of the positions of stars in its field of view. However, the measurements performed by a stellar sensor are sometimes too noisy to make it possible to determine the attitude of the satellite with sufficient accuracy, based only on the measurements of the stellar sensor.

It is also known practice to determine the attitude variations of an artificial satellite by installing gyrometers in the satellite. The gyrometers are kinetic sensors which measure the speed of rotation of the satellite, a speed of rotation which makes it possible to determine the attitude variations of the satellite. In practice, it is not uncommon to have four gyrometers or more in a satellite, to determine the attitude variations of said satellite.

The current attitude determining devices are generally provided with both gyrometers and a stellar sensor. Such devices make it possible to determine the attitude of the satellite with good accuracy, because the measurements supplied by the gyrometers make it possible to filter the measurement noises of the stellar sensors. However, such devices are costly, in particular because of the presence of numerous gyrometers.

OBJECT AND SUMMARY OF THE INVENTION

The aim of the present invention is to remedy the drawbacks of the devices offered by the prior art, notably those explained hereinabove, by proposing a solution which makes it possible, for certain missions, to have attitude and/or attitude variation determination devices which have no gyrometers, while reducing the impact of the measurement noises of the stellar sensors on the efficiency of the attitude and/or attitude variation determination.

According to a first aspect, the invention relates to a device for determining an attitude or an attitude variation of a satellite, said satellite being provided with an attitude control system comprising at least one inertial actuator, said at least one inertial actuator comprising a rotary element mounted to move in rotation about an axis of rotation, a rotary element whose rotation is controlled to create an attitude control torque for said satellite. The device further comprises:

an angular sensor intended to equip the at least one inertial actuator, suitable for measuring the angle of rotation of the rotary element about its axis of rotation, computation means configured to determine the attitude or the attitude variation of the satellite, induced by the rotation of the rotary element of the at least one inertial actuator, as a function of measurements of the angle of rotation of the rotary element by the angular sensor.

By virtue of the principle of conservation of the kinetic moment, the variations of the speed of rotation of the satellite and of the speed of rotation of the rotary element of the inertial actuator are linked.

In practice, the measurements of speed of rotation or of angular acceleration of the rotary element of the inertial actuator are generally very noisy, particularly when they are weak. The attitude estimated as a function of measurements of the speed of rotation or measurements of angular acceleration of the rotary element is then imprecise, and all the more so when these noisy measurements have to be integrated to restore the attitude.

By considering angular sensors suitable for directly measuring the angle of rotation of the rotary element of the inertial actuator, the efficiency with which the attitude of the satellite is restored is enhanced compared to the use of measurements of the speed of rotation or of the angular acceleration of such a rotary element. In effect, the measurements of the angle of rotation are more accurate than the measurements of the speed of rotation or of the angular acceleration of such a rotary element.

According to particular embodiments, the device comprises one or more of the following features, taken in isolation or in all technically possible combinations:

the device comprises an attitude sensor suitable for measuring the attitude of the satellite, and the computation means are configured to determine the attitude of the satellite as a function of measurements of the angle of rotation of the rotary element by the angular sensor and as a function of measurements of the attitude of the satellite by the attitude sensor;

the attitude sensor is a stellar sensor;

the computation means comprise at least one digital estimation filter, preferably a Kalman filter;

the angular sensor is suitable for measuring the angle of rotation of the rotary element with a resolution equal to or less than $1/128^{th}$ of a revolution, preferably equal to or less than $1/512^{th}$ of a revolution;

the angular sensor is a Hall effect sensor or an optical coder.

According to a second aspect, the invention relates to a satellite comprising an attitude control system and a device for determining attitude or attitude variation according to any embodiment of the invention, and in which the at least one inertial actuator is a reaction wheel.

Preferably, the satellite has no gyrometer (or gyroscope) directly measuring the attitude or attitude variation of the satellite.

According to a third aspect, the invention relates to a method for determining an attitude or an attitude variation of a satellite, said satellite being provided with an attitude control system comprising at least one inertial actuator, said at least one inertial actuator comprising a rotary element mounted to move in rotation about an axis of rotation, a rotary element whose rotation is controlled to create an attitude control torque for said satellite. Furthermore, the at least one inertial actuator being previously provided with an angular sensor suitable for measuring the angle of rotation of the rotary element about its axis of rotation, the method comprises the steps of:

measuring the angle of rotation of the rotary element about its axis of rotation by means of said angular sensor,
  determining the attitude or the attitude variation of the satellite, induced by the rotation of the rotary element of the at least one inertial actuator, as a function of measurements of the angle of rotation of the rotary element by the angular sensor.

According to particular implementations, the method comprises one or more of the following features, taken in isolation or in all technically possible combinations:

the satellite being previously provided with an attitude sensor suitable for measuring the attitude of the satellite, the method comprises a step of measuring the attitude of the satellite, and the attitude of the satellite is determined as a function of measurements of the angle of rotation of the rotary element by the angular sensor and as a function of measurements of the attitude of the satellite by the attitude sensor;
  the attitude of the satellite is determined also as a function of torque setpoints applied to the at least one inertial actuator;
  the step of determining the attitude of the satellite implements a digital estimation filter, the measurements of the angle of rotation of the rotary element and the measurements of the attitude of the satellite being supplied as input to said digital estimation filter; preferably, the digital estimation filter is a Kalman filter;
  the step of determining the attitude of the satellite comprises the substeps of:
    estimating the torque created by the at least one inertial actuator as a function of measurements of the angle of rotation of the rotary element,
    estimating the attitude of the satellite as a function of the estimate of the torque created by the at least one inertial actuator and as a function of measurements of the attitude of the satellite by the attitude sensor;
  the substep of estimating the attitude of the satellite implements a first Kalman filter, and the measurements of the attitude of the satellite and the estimate of the torque created by the at least one inertial actuator are supplied as input to said first Kalman filter;
  the substep of estimating the torque created by the at least one inertial actuator implements a second Kalman filter, and the measurements of the angle of rotation of the rotary element are supplied as input to said second Kalman filter.

According to a fourth aspect, the invention relates to a computer program product, comprising a set of program code instructions which, when they are executed by a processor, implement a method for determining attitude or attitude variation according to any implementation of the invention.

DESCRIPTION OF THE FIGURES

The invention will be better understood on reading the following description, given as a nonlimiting example, and with reference to the figures which represent.

DETAILED DESCRIPTION OF EMBODIMENTS

Figure 1:
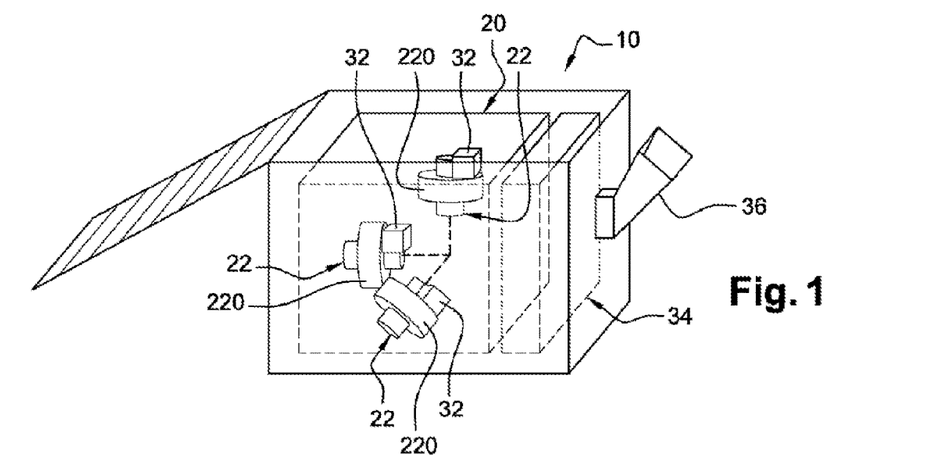
FIG. 1: a schematic representation of a satellite provided with an attitude determination device according to the invention.

FIG. 1 represents, very schematically, a satellite 10 according to the invention, notably comprising an attitude control system 20.

The attitude control system 20 comprises actuators that make it possible to modify the attitude of the satellite 10, including at least one inertial actuator 22. In the embodiment illustrated by FIG. 1, the attitude control system 20 comprises three inertial actuators 22. There is nothing to preclude, according to other embodiments not illustrated by the figures, having a different number of inertial actuators.

The inertial actuators 22 are of the type comprising a rotary element or rotor 220 mounted to move in rotation about an axis of rotation, the rotation of which makes it possible to create an attitude control torque for said satellite 10. The inertial actuators 22 are controlled by implementing conventional means which lie within the context of the invention.

Hereinafter in the description, the case will be assumed in which the inertial actuators 22 are reaction wheels. The invention is nevertheless applicable to other types of inertial actuators comprising a rotary element, such as, for example, inertia wheels.

The attitude control system 20 also comprises a device 30 for determining the attitude of the satellite 10.

The attitude determination device 30 further comprises angular sensors 32, each reaction wheel 22 being equipped with one of these angular sensors 32.

Each angular sensor 32 is suitable for measuring the angle of rotation of the rotor 220 of the reaction wheel 22 associated with this angular sensor, about the axis of rotation of said rotor.

For example, the angular sensors 32 are Hall effect sensors and/or optical coders, considered to be known to those skilled in the art. Although they are generally implemented to measure the speed of rotation of the rotor, such angular sensors 32 can be considered as incremental coders, and thus measure the cumulative angle of rotation of the rotors 220 by counting the number of measurement steps travelled since a prior instant.

The attitude determination device 30 also comprises computation means 34 configured to restore the attitude of the satellite 10, induced by the rotation of the rotors 220 of the reaction wheels, as a function of the measurements of the angles of rotation of the rotors 220 performed by the angular sensors 32.

The computation means 34 for example take the form of a computation unit linked to the angular sensors 32. The computation unit comprises at least one processor and storage means in which is stored a computer program product in the form of a set of program code instructions to be executed to perform the computations needed to determine the attitude of the satellite 10. In a variant, the computation unit also comprises one or more programmable logic circuits, of FPGA, PLD, etc. type, adapted to perform all or some of the computations needed to determine the attitude of the satellite 10.

There now follows a description of how the measurements performed by the angular sensors 32 can be used to determine the attitude of the satellite 10.

Through the principle of conservation of the kinetic moment, the variations of the speed of rotation of the satellite 10 and of the speed of rotation of the rotor 220 of this reaction wheel 22 are linked. If a formulation is considered with an axis of the dynamics of the assembly comprising the satellite 10 and a reaction wheel 22, the following relationship applies:

$$\dot{H} = I \cdot \dot{\Omega} + J \cdot \dot{\omega} = C_e \quad (e1)$$

an expression in which:

" ˙ " corresponds to the derivation operator,

H is the total kinetic moment of the assembly comprising the satellite 10 and the reaction wheel 22, I is the inertia of the satellite 10, Ω is the speed of rotation of the satellite 10, J is the inertia of the rotor 220 of the reaction wheel 22, ω is the speed of rotation of the rotor 220 of the reaction wheel 22, $C_e$ corresponds to the external torque due to external disturbances.

In the absence of external disturbances, that is to say when the external torque $C_e$ is substantially zero, the variation of the speed of rotation of the satellite 10 is proportional to the variation of the speed of rotation of the rotor:

$$\dot{\Omega} = -\left(\frac{J}{I}\right) \cdot \dot{\omega} \quad (e2)$$

It will therefore be understood that if there is an accurate measurement of the speed of rotation of the rotor 220, and if the ratio J/I is known, then it is possible to determine the angular speed of the satellite 10 without having to use one or more gyrometers.

By considering an angular sensor 32 suitable for measuring the angle of rotation Δα of the rotor 220 between two instants separated by a duration ΔT, it is possible to determine the attitude variation Δθ of the satellite 10, if the total kinetic moment H, which is the integral of the external torques $C_e$, is also known. The following expression then applies:

$$\Delta\theta = H \cdot \Delta T - \left(\frac{J}{I}\right) \cdot \Delta\alpha \quad (e3)$$

Thus, the observation of the angle of rotation Δα of the rotor 220 between two instants makes it possible to observe the attitude variation Δθ of the satellite 10 between these two instants. If the attitude of the satellite 10 at a given instant is known, it is consequently possible to determine the attitude of said satellite at a subsequent instant by integrating the angles of rotation Δα of the rotor 220, in order to obtain a cumulative angle of rotation α. It should be noted that the angular sensors of the incremental coder type directly measure the cumulative angle of rotation α, that is to say that they directly measure the integral of the angles of rotation Δα relative to a prior instant.

It will therefore be understood that, by equipping the reaction wheels 22 with the angular sensors 32 and through an appropriate processing of the measurements of the angles of rotation (relative Δα or cumulative α) of the rotors 220 of these reaction wheels, it is possible to determine the attitude variation of the satellite 10, and also the attitude of the satellite 10 following this variation, if the attitude of said satellite before this variation is known.

It should be noted that, according to the present invention, the angles of rotation (relative Δα or cumulative α) of said rotors are measured, but should not be confused with the speeds of rotation and/or the angular accelerations of said rotors. In effect, the measurements of the speed of rotation or of the angular acceleration are generally noisy, so said measurements have to be integrated to restore the attitude of the satellite 10. This is why consideration is advantageously given to angular sensors 32 suitable for directly measuring the angle of rotation (relative Δα or cumulative α), in as much as such angular sensors 32 will make it possible more often than not to obtain better performance levels in the restoration of the attitude of the satellite 10 than the sensors that make it possible to measure only the speed of rotation or the angular acceleration.

In practice, in the attitude control systems of the prior art, it is known practice to provide the reaction wheels with angular sensors, of the tachometer type, such as Hall effect sensors or optical coders, the measurements from which are used to estimate the speeds of rotation of the rotors for the purposes of local control and/or monitoring of the reaction wheel through electronics. According to the invention, the rotation angle measurements supplied by these angular sensors will then be able to be advantageously used to restore the attitude of the satellite 10, such that the implementation of the invention does not require the addition of angular sensors dedicated to attitude restoration, but will be able to use the pre-existing tachometers to obtain measurements of the angles of rotation of said rotors.

In all cases, the angular sensors, such as Hall effect sensors or optical coders, are components that are less costly than gyrometers. In the case where the attitude determination device 30 would be without gyrometers, the addition of angular sensors 32 solely for the purpose of restoring the attitude in accordance with the invention will result in a device 30 whose complexity and cost would be lower than those of the devices comprising gyrometers.

It should be noted that, if only the measurements of the angles of rotation of the rotors 220 of the reaction wheels 22 are used by the device 30, said device 30 will, in practice, be suitable for determining only the attitude variation of the satellite 10.

It should also be noted that the determination of the attitude variation as a function of just the measurements of the angles of rotation of the rotors 220 of the reaction wheels 22 is effective only subject to the condition that the reaction wheels 22 are the main source of attitude variation of the satellite 10.

Such will, for example, be the case when the attitude of the satellite 10 is controlled exclusively by the reaction wheels 22, and when the external torques $C_e$ are negligible or accurately known (for example because they vary slowly) over the characteristic time horizon during which the changes of the attitude are to be restored. This will not generally be the case if the external torques $C_e$ are not negligible and lead to strong attitude variations and/or if these external torques $C_e$ vary rapidly such that they cannot be estimated with sufficient accuracy.

In all cases, particularly when the restoration of the attitude of the satellite 10 is not possible based only on the measurements of the angles of rotation of the rotors of the reaction wheels 22, other measurements can be used.

In particular, in the preferred embodiment illustrated by FIG. 1, the device 30 further comprises an attitude sensor, suitable for measuring the attitude of the satellite 10. In such a case, the device 30 can be implemented not only to determine the attitude variation of the satellite 10 between two instants, but also the attitude of the satellite 10 in any predefined coordinate system. Hereinafter in the description, unless stipulated otherwise, the case will be assumed in which the device 30 is implemented to determine the attitude of the satellite 10.

Preferably, the attitude sensor is an optical sensor. Hereinafter in the description, the case will be assumed in a nonlimiting manner in which the attitude sensor is an optical sensor of the stellar sensor 36 type.

Furthermore, the computation means 34 are configured to determine the attitude of the satellite 10 as a function not only of the measurements of the angles of rotation of the rotors 220 from the angular sensors 32, but also as a function of the measurements of the attitude of the satellite 10 by the stellar sensor 36. In other words, the computation means 34 implement a filter for estimating the attitude of the satellite 10, which performs a merging of the measurements performed by the angular sensors 32 and the measurements performed by the stellar sensor 36.

Because of the measurements of the attitude of the satellite 10 by the stellar sensor 36, the determination of the attitude of the satellite 10 will be more robust than by using only the measurements of the angles of rotation of the rotors 220 of the reaction wheels 22.

Compared to an attitude determination device which would use only attitude measurements supplied by a stellar sensor, the use of the measurements of the angles of rotation of the rotors 220 of the reaction wheels 22 makes it possible to improve the performance levels in restoring the attitude of the satellite 10. In effect, since the attitude measurements supplied by the stellar sensor 36 are noisy, the addition of the measurements made by the angular sensors 32 makes it possible to filter some of the noise of the measurements from said stellar sensor.

Preferably, the computation means 34 comprise at least one dynamic digital filter of Kalman filter type.

Below is a description of nonlimiting examples of Kalman filters suitable for making it possible to determine the attitude of the satellite 10 as a function of the measurements of the angular sensors 32 and of the measurements of the stellar sensor 36. In order to simplify the equations, a one-dimensional system is assumed, by formulating the filters along a single attitude control axis and for a single reaction wheel 22. The generalization of these equations to the case with N reaction wheels 22 for the control of the satellite 10 on three axes can be effected in a conventional manner.

Figure 2A:
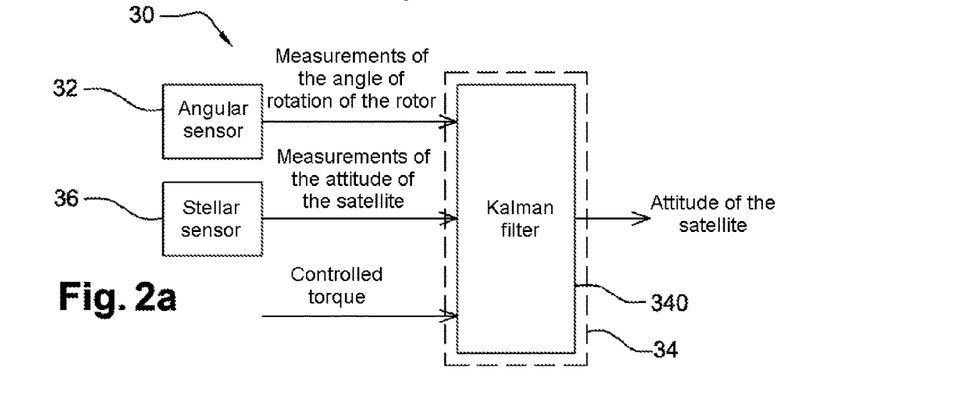
FIGS. 2a and 2b: schematic representations of exemplary implementations of the invention implementing one or more dynamic digital filters.

FIG. 2a represents a first example in which the computation means 34 comprise a single Kalman filter 340.

The case of a conventional linear Kalman filter is assumed in a nonlimiting manner. As is known to those skilled in the art, such a filter is a recursive estimation filter which comprises two main steps, a prediction (or propagation) step and an updating (or adjustment) step during which the following parameters are determined iteratively:

$x_{k,k}$: estimation of the state vector $x_k$ of the filter 340 at the instant k, $P_{k,k}$: matrix of covariance of the error on the state of the filter 340.

As is known, the prediction of the state of the filter and the prediction of the error covariance matrix can be performed according to the following expressions:

$$x_{k+1,k} = F_k \cdot x_{k,k} + B_k \cdot u_k \quad (e4)$$

$$P_{k+1,k} = F_k \cdot P_{k,k} \cdot F_k^T + Q_k \quad (e5)$$

expressions in which:

$F_k$ is a transition matrix, which links the state at the instant k to the state at the instant k+1, $u_k$ is a control input, $B_k$ is a matrix which links the control input $u_k$ to the state vector of the filter, $Q_k$ is a noise covariance matrix.

$A^T$ is the transposed matrix of a matrix A.

As is known, the updating of the estimation of the state vector of the filter 340 and the updating of the error covariance matrix are performed, for example, according to the following relationships:

$$x_{k+1,k+1} = x_{k+1,k} \cdot (Id \cdot K_k) + K_k \cdot y_k \quad (e6)$$

$$P_{k+1,k+1} = (Id + K_k \cdot H_k) \cdot P_{k+1,k} \cdot (Id + K_k \cdot H_k)^T + K_k \cdot R_k \cdot K_k \quad (e7)$$

expressions in which:

$y_k$ corresponds to the measurements supplied as input to the filter 340, $H_k$ is a matrix which links the state vector $x_k$ to the measurements $y_k$, $R_k$ is a measurement noise covariance matrix, Id is an identity matrix, $K_k$ is a gain matrix.

As is known, the gain matrix $K_k$ is, for example, computed according to the relationship:

$$K_k = P_{k+1,k} \cdot H_k^T \cdot (R_k + H_k \cdot P_{k+1,k} \cdot H_k^T)^{-1} \quad (e8)$$

In the context of the invention, and as illustrated by FIG. 2a, the Kalman filter 340 preferably takes as input:

the measurements of the angle of rotation of the rotor 220 of the reaction wheel 22 by the angular sensor 32, the measurements of attitude of the satellite 10 by the stellar sensor 36, a controlled torque (or torque setpoint) on the reaction wheel 22 by the attitude control system 20.

The states of the filter 340 comprise, for example, the following states:

α: cumulative angle of rotation of the rotor 220 of the reaction wheel 22, ω: speed of rotation of the rotor 220, f: angular acceleration of the rotor due to friction, θ: attitude of the satellite 10, Ω: speed of rotation of the satellite 10, c: angular acceleration of the satellite 10 due to the external torques, d: derivative of the external disturbing torques.

The state vector $x_k$ of the filter at the instant k then comprises the following discrete states:

$$x_k = [\alpha_k \omega_k f_k \theta_k \Omega_k c_k d_k]^T \quad (e9)$$

In order to predict the state of the filter and the error covariance matrix, the following continuous dynamic equations are considered:

$$\dot{\alpha} = \omega \quad (e10)$$

$$\dot{\omega} = -\frac{1}{J} \cdot (C_c + C_f) \quad (e11)$$

$$\dot{\theta} = \Omega \quad (e12)$$

$$\dot{\Omega} = \frac{1}{I} \cdot (C_c + C_e + C_f) \quad (e13)$$

equations in which:
$C_c$ is the controlled torque on the reaction wheel 22,
$C_f$ is the friction torque of the rotor 220 of the reaction wheel.

The expressions (e10) and (e11) correspond to the continuous dynamic equations for the prediction of the states associated with the reaction wheel 22, whereas the expressions (e12) and (e13) correspond to the continuous dynamic equations for the prediction of the states associated with the satellite 10.

The dynamic equations in the discrete domain (sampled) are deduced from the continuous dynamic equations and can be expressed in the following approximate forms:

$$\alpha_{k+1} = \alpha_k + \Delta T \cdot \omega_k - \frac{\Delta T^2}{2} \cdot \left( f_k + \frac{I}{J} \cdot u_k \right) \quad (e14)$$

$$\omega_{k+1} = \omega_k - \Delta T \cdot \left( f_k + \frac{I}{J} \cdot u_k \right) \quad (e15)$$

$$f_{k+1} = f_k \cdot \left( 1 - \frac{\Delta T}{\tau_f} \right) \quad (e16)$$

$$\theta_{k+1} = \theta_k + \Delta T \cdot \Omega_k - \frac{\Delta T^2}{2} \cdot \left( c_k + u_k + \frac{J}{I} \cdot f_k \right) \quad (e17)$$

$$\Omega_{k+1} = \Omega_k + \Delta T \cdot \left( c_k + u_k + \frac{J}{I} \cdot f_k \right) \quad (e18)$$

$$c_{k+1} = c_k + \Delta T \cdot d_k \quad (e19)$$

expressions in which:
$\Delta T$ is the sampling period,
$u_k$, the control input, corresponds to the controlled torque standardized by the inertia of the satellite 10, i.e. $C_c/I$,
the friction of the rotor 220 is modeled by an exponentially correlated random variable, that is to say a white noise of zero mean and of standard deviation $\sigma_f$ filtered by a low-pass filter of time constant $\tau_f$, the covariance associated with this exponentially correlated random variable, to be added to the matrix $Q_k$, is then expressed as $2 \cdot \Delta T \cdot \sigma_f^2 / \tau_f$.

In the nonlimiting example described, the derivative $d_k$ of the external torques $C_e$ is not estimated because their trend model is not considered to be known. For this, the gains which multiply the derivative $d_k$ in the gain matrix $K_k$ are arbitrarily set to zero.

The angular sensor 32 and the stellar sensor 36 supply measurements respectively of the cumulative angle of rotation $\alpha$ of the rotor 220 of the reaction wheel 22 and of the attitude $\theta$ of the satellite 10. The matrix $H_k$ is expressed as follows:

$$H_k = \begin{bmatrix} 1 & 0 & 0 & 0 & 0 & 0 & 0 \\ 0 & 0 & 0 & 1 & 0 & 0 & 0 \end{bmatrix} \quad (e20)$$

In order to simplify the setting of the Kalman filter 340, the stellar measurement noise can be modeled by a Gaussian white noise of zero mean and of standard deviation $\sigma_s$, the value of which is chosen in a conventional manner as a function of an a priori knowledge of characteristics of the measurement noise.

The measurement noise of the cumulative angle of rotation $\alpha$ corresponds mainly to the quantization error on the angular position of the rotor 220, and is substantially the same as the measurement noise of the angle of rotation $\Delta\alpha$.

If the speed of rotation of the rotor 220 is sufficiently variable, the quantization error can be modeled as a Gaussian white noise of zero mean and of standard deviation $\sigma_\alpha$ expressed as a function of a quantization step q as:

$$\sigma_\alpha \approx \frac{q}{\sqrt{12}} \quad (e21)$$

The measurement noise covariance matrix $R_k$ is expressed in this case as follows:

$$R_k = \begin{bmatrix} \sigma_s^2 & 0 \\ 0 & \frac{q^2}{12} \end{bmatrix} \quad (e22)$$

Given the expressions (e14) to (e19), the transition matrix $F_k$ can be expressed as follows:

$$F_k = \begin{bmatrix} 1 & \Delta T & \frac{-\Delta T^2}{2} & 0 & 0 & 0 & 0 \\ 0 & 1 & -\Delta T & 0 & 0 & 0 & 0 \\ 0 & 0 & 1 - \frac{\Delta T}{\tau_f} & 0 & 0 & 0 & 0 \\ 0 & 0 & \left(\frac{J}{I}\right) \cdot \frac{\Delta T^2}{2} & 1 & \Delta T & \frac{\Delta t^2}{2} & 0 \\ 0 & 0 & \left(\frac{J}{I}\right) \cdot \Delta T & 0 & 1 & \Delta T & 0 \\ 0 & 0 & 0 & 0 & 0 & 1 & \Delta T \\ 0 & 0 & 0 & 0 & 0 & 0 & 1 \end{bmatrix} \quad (e23)$$

The control matrix $B_k$ can be expressed as follows:

$$B_k = \frac{1}{J} \cdot \left[ \frac{-\Delta T^2}{2} \quad -\Delta T \quad 0 \quad \left(\frac{J}{I}\right) \cdot \frac{\Delta T^2}{2} \quad \left(\frac{J}{I}\right) \cdot \Delta T \quad 0 \quad 0 \right] \quad (e24)$$

It should be noted that, generally, taking into account the friction of the rotor 220 in the filter 340 makes it possible to have a more robust estimator in the case of friction instability. Furthermore, by measuring the angle of rotation of the rotor 220, and supplying the controlled torque $u_k$ as input makes it possible to also have enhanced robustness in case of friction, and makes it possible to deduce the torque actually created by the reaction wheel 22, which differs from the controlled torque notably by virtue of said friction.

Figure 2B:
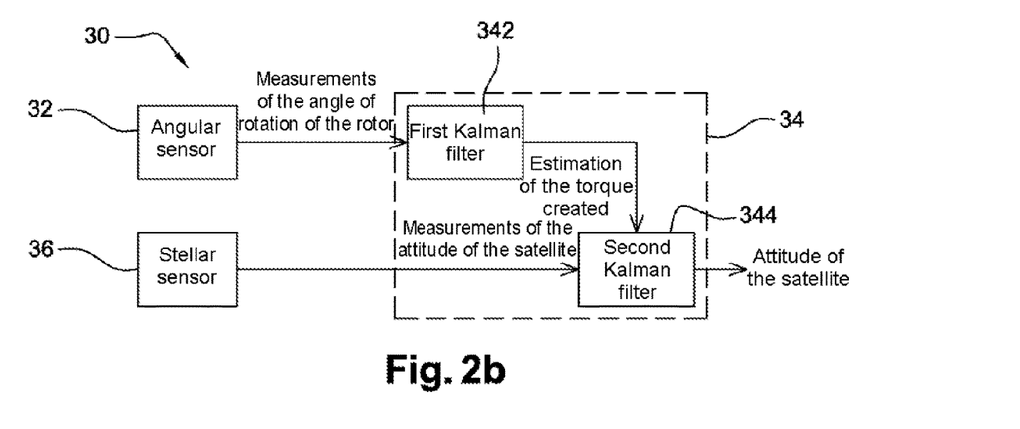

FIG. 2b schematically represents a second example in which the computation means 34 comprise two Kalman filters: a first Kalman filter 342 and a second Kalman filter 344.

The first Kalman filter 342 is implemented to estimate the torque created by the reaction wheel 22. If the Kalman filter 340 described hereinabove with reference to FIG. 2a is considered, the first filter 342 can, for example, retain only the states [$\alpha$, $\omega$, f], such that the transition matrix of the first filter 342 is obtained from the expression (e23) by retaining only the coefficients relating to the states [$\alpha$, $\omega$, f]:

$$F_k = \begin{bmatrix} 1 & \Delta T & \dfrac{-\Delta T^2}{2} \\ 0 & 1 & -\Delta T \\ 0 & 0 & 1 - \dfrac{\Delta T}{\tau_f} \end{bmatrix} \quad (e25)$$

At the output of the first filter 342, the torque created, designated by $u'_k$, is, for example, computed as follows:

$$u'_k = -\frac{1}{I} \cdot \frac{(\omega_{k+1} - \omega_k)}{\Delta T} \quad (e26)$$

The second Kalman filter 344 is implemented to determine the attitude of the satellite as a function of the attitude measurements by the stellar sensor 36 and is a function of the estimate of the torque created $u'_k$. If the Kalman filter 340 described above is considered, the second filter 344 can, for example, retain only the states [θ, Ω, c, d], such that the transition matrix of the second filter 344 is obtained from the expression (e23) by retaining only the coefficients relating to the states [θ, Ω, c, d]:

$$F_k = \begin{bmatrix} 1 & \Delta T & \dfrac{\Delta T^2}{2} & 0 \\ 0 & 1 & \Delta T & \dfrac{\Delta T^2}{2} \\ 0 & 0 & 1 & \Delta T \\ 0 & 0 & 0 & 1 \end{bmatrix} \quad (e27)$$

The control matrix $B_k$ can be expressed as follows:

$$B_k = \lfloor \Delta T^2/2 \Delta T 0 0 \rfloor \quad (e28)$$

The separation into a first filter 342 and a second filter 344 is advantageous because it exhibits a better backward compatibility with any existing filters. In effect, the first filter 342 can be implemented to improve the performance levels of any existing attitude estimation filter which might take as input the controlled torque, without it being necessary to modify this existing filter.

As indicated previously, the generalization of the preceding examples with a number N of reaction wheels 22 for a control of the attitude of the satellite 10 on three axes is performed in a conventional manner. For example, in the case described with reference to FIG. 2b, it is possible to provide a first Kalman filter 342 for each of the reaction wheels 22, so as to estimate the states [α, ω, f] for each of the reaction wheels. The estimate of the torque created $u'_k$ is, for example, obtained as follows:

$$u'_k = -\frac{1}{I \cdot \Delta T} \cdot W \cdot \begin{bmatrix} \omega^1_{k+1} - \omega^1_k \\ \omega^2_{k+1} - \omega^2_k \\ \vdots \\ \omega^N_{k+1} - \omega^N_k \end{bmatrix} \quad (e29)$$

expression in which:

W is a projection matrix of the axes of the reaction wheels on the three axes of a coordinate system associated with the satellite 10, $\omega^n_k$ is the speed of rotation of the rotor 220 of the nth reaction wheel 22 at the instant k.

Generally, the expressions given above with reference to FIGS. 2a and 2b illustrate preferred implementations based on one (FIG. 2a) or two (FIG. 2b) Kalman filters making it possible to determine the attitude of the satellite 10 as a function of the measurements of the angles of rotation of the rotors 220 by the angular sensors 32 and as a function of the attitude measurements by the stellar sensor 36.

It should be understood that these expressions are not limited to the invention and that a particular choice of implementation of the Kalman filter or filters, using the measurements of the angles of rotation of the rotors 220 by the angular sensors 32 and the attitude measurements by the stellar sensor 36, constitutes only a particular implementation of the invention.

Even more generally, it is also possible to consider filters other than Kalman filters. The filters can be any type of dynamic estimation filter, and/or any type of constant gain static filter. Notably, in the example described with reference to FIG. 2b, there is nothing to preclude replacing one and/or both filters with filters which are not Kalman filters, including with constant gain filters.

Figure 3A:
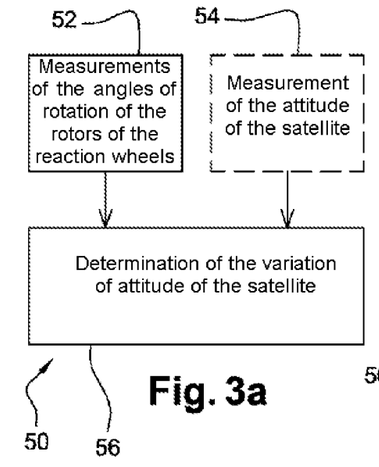
FIGS. 3a and 3b: diagrams schematically representing the main steps of a method for determining the attitude of a satellite according to two implementations.

FIG. 3a schematically represents the main steps of a method 50 for determining attitude or attitude variation, implemented by the device 30 according to the invention.

As represented by FIG. 3a, the method 50 comprises the following steps:

52 measurement of the angles of rotation of the rotors 220 of the reaction wheels 22 by means of the angular sensors 32,

56 determination of the attitude of the satellite, induced by the rotation of the rotors 220 of the reaction wheels 22, as a function of the measurements of the angles of rotation of said rotors.

When the satellite 10 comprises a stellar sensor 36, the method preferably comprises a supplementary step 54, that can be seen in FIG. 3a, of measurement of the attitude of the satellite 10 by said stellar sensor. The attitude of the satellite is then determined during the step 56 as a function of the measurements of the angles of rotation of the rotors and of the measurements of the attitude of the satellite.

In one variant, the attitude of the satellite 10 is determined also as a function of torque setpoints applied to the reaction wheels 22. Such is the case notably in the example described with reference to FIG. 2a, in which the controlled torque $u_k$ is supplied as input to the Kalman filter 340. This is advantageous in as much as the knowledge of the controlled torque $u_k$ and of the angles of rotation of the rotors 220 (and their speeds of rotation) makes it possible to better estimate the friction torque $C_f$, and thus better estimate the torques actually created by the reaction wheels 22. In this way, the efficiency with which the attitude of the satellite 10 is determined is enhanced.

Preferably, and as indicated previously, the step 56 of determining the attitude of the satellite 10 implements a Kalman filter 340, the measurements of the angles of rotation of the rotors 220 and the measurements of the attitude of the satellite 10 being supplied as input to said Kalman filter 340.

Figure 3B:
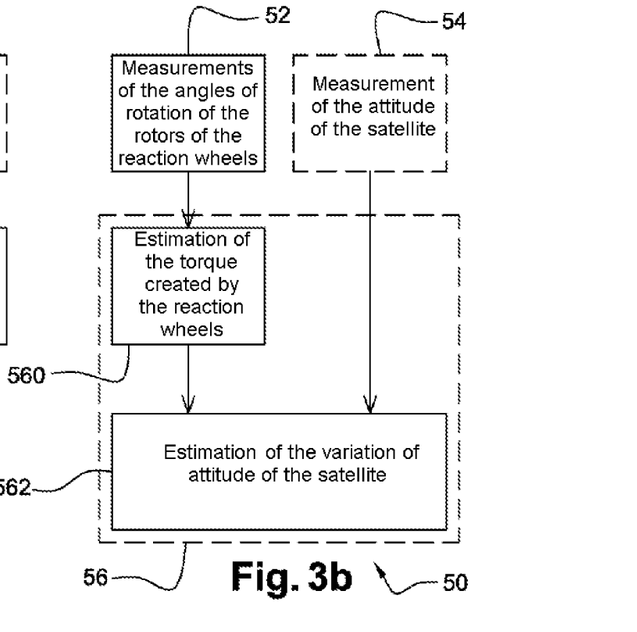

FIG. 3b schematically represents a preferred implementation of the method 50. Compared to FIG. 3a, the step 56 of determining the attitude of the satellite 10 comprises the substeps of:

560 estimating the torques created by the reaction wheels 22 as a function of measurements of the angles of rotation of the rotors 220, 562 estimating the attitude of the satellite 10 as a function of the estimates of the torques created by the reaction wheels 22 and as a function of measurements of the attitude of the satellite 10 by the stellar sensor 36.

In the case of the device 30 described with reference to FIG. 2b, the substep 560 is executed by the first filter 342 and the substep 562 is executed by the second filter 344.

The efficiency with which the attitude of the satellite 10 is determined will now be discussed.

From a theoretical point of view, it has been seen how the measurement noise of the cumulative angle of rotation corresponds mainly to the quantization error on the angular position of the rotor 220, which can be modeled like a Gaussian white noise of zero mean and of standard deviation $\sigma_\alpha$, being expressed as a function of a quantization step q as:

$$\sigma_\alpha \approx \frac{q}{\sqrt{12}} \quad (e30)$$

This quantization error induces an error in the determination of the attitude of the satellite 10 which can also be modeled as a Gaussian white noise of zero mean and of standard deviation $\sigma_\theta$ that is expressed as:

$$\sigma_\theta \approx \frac{J}{I} \cdot \frac{q}{\sqrt{12}} \quad (e31)$$

For a quantization step q of $1/24^{th}$ of a revolution and an inertia ratio I/J of 25000, the quantization error thus represents an error on the determination of the attitude of the satellite 10 of standard deviation $\sigma_\theta$ substantially equal to 3 microradians (μrad), which is lower than the standard deviations of the measurement noises observed on measurements supplied by stellar sensors (generally of the order of 20 μrad). By considering a quantization step q of $1/200^{th}$ of a revolution, the standard deviation $\sigma_\theta$ is reduced to approximately 0.36 μrad, rendering the quantization error negligible.

For agile satellites, the inertia ratio I/J does, however, become less favorable. For example, if the inertia ratio I/J is brought to a value lying between 6000 and 8500, the accuracy of determination of the attitude by means of the angular sensors 32 is reduced by a factor of 3 to 4.

Figure 4:
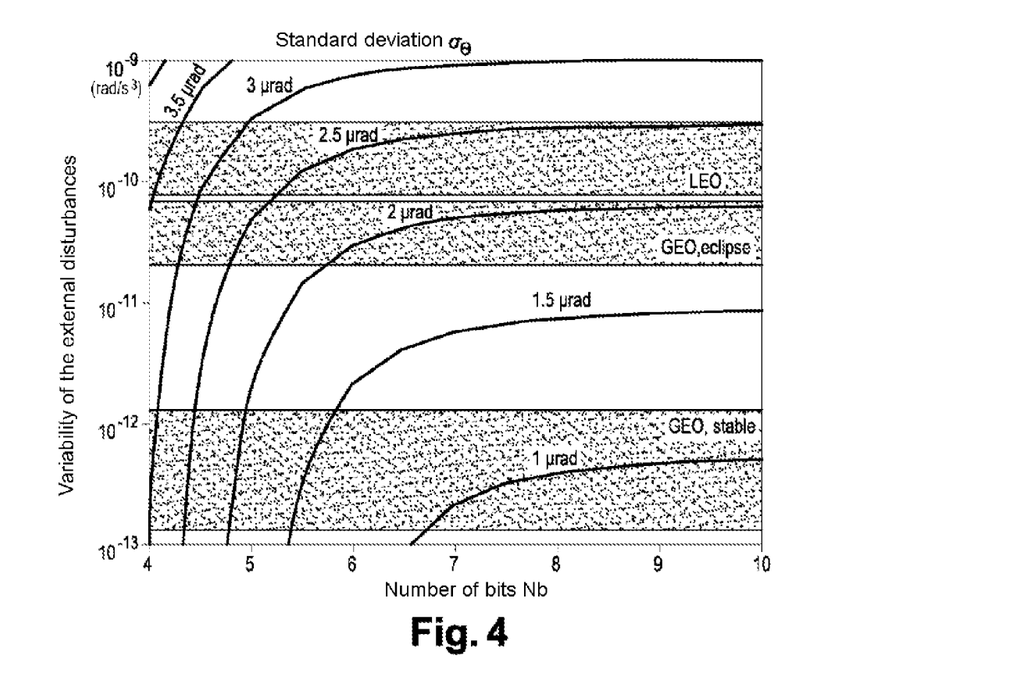
FIG. 4: curves illustrating the performance levels expected in terms of attitude determination accuracy.

FIG. 4 illustrates the efficiency in determining the attitude. More particularly, FIG. 4 represents curves for different standard deviation $\sigma_\theta$ values, as a function both of the resolution of the measurement of the angle of rotation (expressed as a number Nb of bits, the quantization step q being equal to $1/2^{Nb}$th of a revolution) and of the uncertainty on the variability of the external disturbances (expressed in rad/s³). The curves represented in FIG. 4 have been obtained by simulation by means of the Kalman filter described above with reference to the expressions (e4) to (e24).

FIG. 4 also highlights the bands of uncertainty on the variability of the external disturbances, corresponding to the following environments:
- low earth orbit LEO: from approximately $8 \cdot 10^{-11}$ to approximately $3 \cdot 10^{-10}$ rad/s³,
- geostationary orbit GEO in an eclipse: from approximately $2 \cdot 10^{-11}$ to approximately $7 \cdot 10^{-11}$ rad/s³,
- stable GEO orbit: from approximately $10^{-13}$ to approximately $10^{-12}$ rad/s³.

It can be seen in FIG. 4 that a quantization step equal to $1/128^{th}$ of a revolution (Nb equal to 7) makes it possible to obtain a standard deviation $\sigma_\theta$ lying between approximately 1.5 μrad and 2.5 μrad in LEO orbit and in GEO orbit in an eclipse. A quantization step equal to $1/512^{th}$ of a revolution (Nb equal to 9) makes it possible to obtain a standard deviation $\sigma_\theta$ close to 1 μrad in stable GEO orbit.

Such quantization steps (equal to or less than $1/128^{th}$ of a revolution, even equal to or less than $1/512^{th}$ of a revolution) are less, even very much less, than the quantization steps considered in the current satellites equipped with reaction wheels provided with angular sensors (tachometers) to estimate the speed of rotation thereof. Furthermore, it should be understood that the quantization step q according to the invention will be determined as a function of the needs of the mission in terms of accuracy of attitude restoration. In particular, the quantization step q according to the invention will be able to be determined as a function of the type of orbit considered: LEO orbit, GEO orbit, Lagrange points, etc.

The above description clearly illustrates that, by its different characteristics and their advantages, the present invention achieves the objectives that were set for it.

In particular, it will be understood that, through the use of measurements of the angles of rotation of the rotors of the reaction wheels to determine the attitude and/or attitude variation of the satellite 10, it will be possible in certain cases to have a satellite 10 without gyrometers.

The invention is however also applicable to satellites equipped with gyrometers, the measurements of the angular sensors 32 being able to be used to complement the measurements of the gyrometers, and/or instead of said measurements of the gyrometers when the latter fail.

The invention is applicable to any satellite whose attitude has to be determined. Furthermore, the attitude determined for the satellite 10 can be used to control the attitude of the satellite 10, and/or to perform an a posteriori processing of data acquired by this satellite 10, etc. For example, in the case of an earth observation satellite 10 or any other celestial body, the determined attitude and/or attitude variation can be transmitted to a ground station with the images acquired by the satellite 10, in order to compensate, in said images, geometrical deformations introduced by the attitude variations of the satellite during the acquisition of these images.

The invention claimed is:

1. A device to restore an attitude of a satellite provided with an attitude control system comprising at least one inertial actuator comprising a rotary element mounted to rotate about an axis of rotation, the device comprising:
    an angular sensor to measure an angle of rotation of the rotary element about its axis of rotation;
    a processor comprising at least one Kalman filter that receives positional measurements of the angle of rotation of the rotary element as input;
    wherein said at least one Kalman filter determines the attitude or the attitude variation of the satellite, induced by the rotation of the rotary element, as a function of said positional measurements of the angle of rotation of the rotary element by the angular sensor without considering a speed of rotation of the rotary element; and
    the rotation of the rotary element being controlled to generate an attitude control torque to restore the attitude of the satellite based on the determined attitude or attitude variation of the satellite.

2. The device as claimed in claim 1, further comprising an attitude sensor to measure the attitude of the satellite; and wherein the processor determines the attitude of the satellite as a function of positional measurements of the angle of rotation of the rotary element by the angular sensor and as a function of measurements of the attitude of the satellite by the attitude sensor.

3. The device as claimed in claim 2, wherein the attitude sensor is a stellar sensor.

4. The device as claimed claim 1, wherein the angular sensor measures the angle of rotation of the rotary element with a resolution equal to or less than $1/128^{th}$ of a revolution.

5. The device of claim 4, wherein the angular sensor measures the angle of rotation of the rotary element with the resolution equal to or less than $1/512^{th}$ of the revolution.

6. The device of claim 1, wherein the angular sensor is a Hall-effect sensor or an optical coder.

7. A satellite comprising an attitude control system comprising the device as claimed in claim 1; and wherein said at least one inertial actuator is a reaction wheel.

8. The satellite as claimed in claim 7 comprises no gyrometer.

9. The device of claim 1, wherein the determined attitude or attitude variation is transmitted to a ground station to compensate for geometrical deformations, introduced by the attitude variation of the satellite, in images acquired by the satellite.

10. The device of claim 1, wherein the angular sensor is configured to measure a cumulative angle of rotation of the rotary element.

11. A method for restoring an attitude of a satellite provided with an attitude control system comprising at least one inertial actuator comprising a rotary element mounted to rotate about an axis of rotation, the method comprising the steps of:
    measuring an angle of rotation of the rotary element about its axis of rotation by an angular sensor of said at least one inertial actuator;
    providing positional measurements of the angle of rotation of the rotary element as input to a first Kalman filter of a processor;
    determining the attitude or the attitude variation of the satellite using the first Kalman filter of the processor, induced by the rotation of the rotary element, as a function of said positional measurements of the angle of rotation of the rotary element by the angular sensor without considering a speed of rotation of the rotary element; and
    controlling the rotation of the rotary element to generate an attitude control torque to restore the attitude of the satellite based on the determined attitude or attitude variation of the satellite.

12. The method as claimed in claim 11, further comprising the steps of:
    measuring the attitude of the satellite by an attitude sensor of the satellite; and
    determining the attitude of the satellite by the processor as a function of the positional measurements of the angle of rotation of the rotary element by the angular sensor and as a function of measurements of the attitude of the satellite by the attitude sensor.

13. The method as claimed in claim 12, further comprising the step of determining the attitude of the satellite as a function of torque setpoints applied to said at least one inertial actuator.

14. The method as claimed in claim 12, further comprising the step of providing the measurements of the attitude of the satellite as input to the first Kalman filter to determine the attitude of the satellite.

15. The method as claimed in claim 12, further comprising the steps of:
    estimating the attitude control torque generated by said at least one inertial actuator as a function of the positional measurements of the angle of rotation of the rotary element; and
    estimating the attitude of the satellite as a function of the estimate of the attitude control torque generated by said at least one inertial actuator and as a function of measurements of the attitude of the satellite by the attitude sensor.

16. The method as claimed in claim 15, further comprising the step of providing the measurements of the attitude of the satellite and the estimate of the attitude control torque generated by said at least one inertial actuator as input to a second Kalman filter to estimate the attitude of the satellite.

17. The method as claimed in claim 16, further comprising providing the positional measurements of the angle of rotation of the rotary element as input to the first Kalman filter to estimate the attitude control torque generated by said at least one inertial actuator.

18. The method of claim 11, further comprising a step of transmitting the determined attitude or attitude variation to a ground station to compensate for geometrical deformations, introduced by the attitude variation of the satellite, in images acquired by the satellite.

19. The device of claim 17, wherein the determined attitude or attitude variation is transmitted to a ground station to compensate for geometrical deformations, introduced by the attitude variation of the satellite, in images acquired by the satellite.

20. The method of claim 11, further comprising a step of measuring a cumulative angle of rotation of the rotary element by the angular sensor.

21. A device to restore an attitude of a satellite provided with an attitude control system comprising at least one inertial actuator comprising a rotary element mounted to rotate about an axis of rotation, the device comprising:
    an angular sensor to measure an angle of rotation of the rotary element about its axis of rotation;
    a programmable logic circuit comprising at least one Kalman filter that receives positional measurements of the angle of rotation of the rotary element as input;
    wherein said Kalman filter determines the attitude or the attitude variation of the satellite, induced by the rotation of the rotary element, as a function of said positional measurements of the angle of rotation of the rotary element by the angular sensor without considering a speed of rotation of the rotary element;
    the rotation of the rotary element being controlled to generate an attitude control torque to restore the attitude of the satellite based on the determined attitude or attitude variation of the satellite.

22. The device of claim 21, wherein the angular sensor is configured to measure a cumulative angle of rotation of the rotary element.

* * * * *